United States Patent
Hehlgans

(10) Patent No.: US 8,789,763 B2
(45) Date of Patent: Jul. 29, 2014

(54) RFID TRANSPONDER

(75) Inventor: Jörg Hehlgans, Diekholzen (DE)

(73) Assignee: Harting Electric GmbH & Co. KG (DE)

( * ) Notice: Subject to any disclaimer, the term of this patent is extended or adjusted under 35 U.S.C. 154(b) by 0 days.

(21) Appl. No.: 13/879,602

(22) PCT Filed: Nov. 17, 2011

(86) PCT No.: PCT/DE2011/075275
§ 371 (c)(1),
(2), (4) Date: Apr. 15, 2013

(87) PCT Pub. No.: WO2012/092922
PCT Pub. Date: Jul. 12, 2012

(65) Prior Publication Data
US 2013/0240633 A1    Sep. 19, 2013

(30) Foreign Application Priority Data

Dec. 7, 2010    (DE) .................... 20 2010 013 072 U

(51) Int. Cl.
| G06K 19/06 | (2006.01) |
| H01Q 13/10 | (2006.01) |
| H01Q 1/42 | (2006.01) |
| G06K 19/077 | (2006.01) |
| H01Q 7/00 | (2006.01) |
| H01Q 1/22 | (2006.01) |
| H04B 5/00 | (2006.01) |

(52) U.S. Cl.
CPC .......... *G06K 19/07749* (2013.01); *H01Q 13/10* (2013.01); *H01Q 1/42* (2013.01); *G06K 19/07773* (2013.01); *H04B 5/0081* (2013.01); *H01Q 7/00* (2013.01); *H01Q 1/2225* (2013.01); *H04B 5/0062* (2013.01); *H04B 5/0068* (2013.01)
USPC .......................................................... 235/492

(58) Field of Classification Search
USPC ........................................................ 235/492
See application file for complete search history.

(56) References Cited

FOREIGN PATENT DOCUMENTS

| DE | 202008001549 | 7/2008 | ............... H04B 1/59 |
| EP | 2214255 | 8/2010 | ............... H01Q 1/38 |
| EP | 2228756 | 9/2010 | ........... G06K 19/077 |

OTHER PUBLICATIONS

International Search Report and Written Opinion issued in corresponding application No. PCT/DE2011/075275, dated May 22, 2012 (13 pgs).

*Primary Examiner* — Kristy A Haupt
(74) *Attorney, Agent, or Firm* — Hayes Soloway P.C.

(57) ABSTRACT

The housing of an RFID transponder, which is attached to a slot antenna, is protected against mechanical stresses and/or reduced mechanical stresses that act on the housing at least to such an extent that damage to the housing and the components arranged therein is prevented. To this end the antenna includes a first antenna part and a second antenna part, which are separated from each other by a slot, at least in one region of the antenna. The housing is composed of a first housing part and a second housing part, wherein the second housing part is arranged over the second antenna part, at least in some regions. The housing is fixed to the first antenna part solely by the first housing part. The housing has at least one step on the outer side directed toward the antenna, such that the height of the second housing part is at least 0.5 mm less than the height of the first housing part.

17 Claims, 8 Drawing Sheets

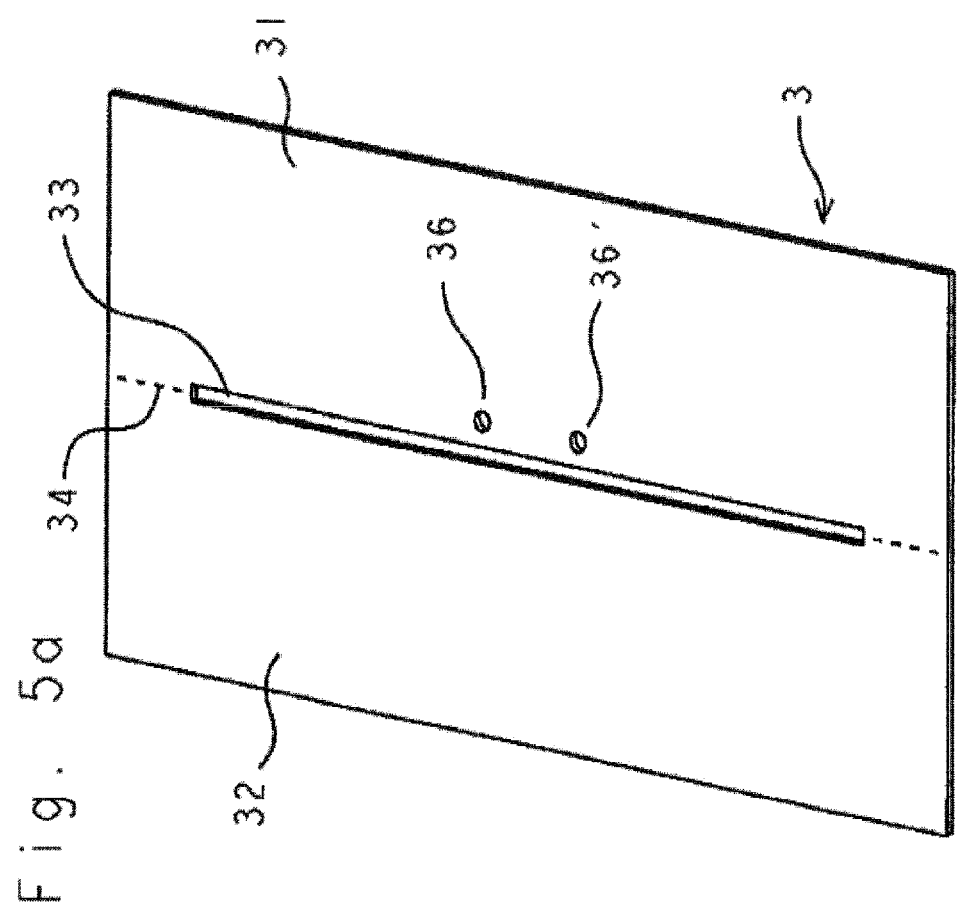

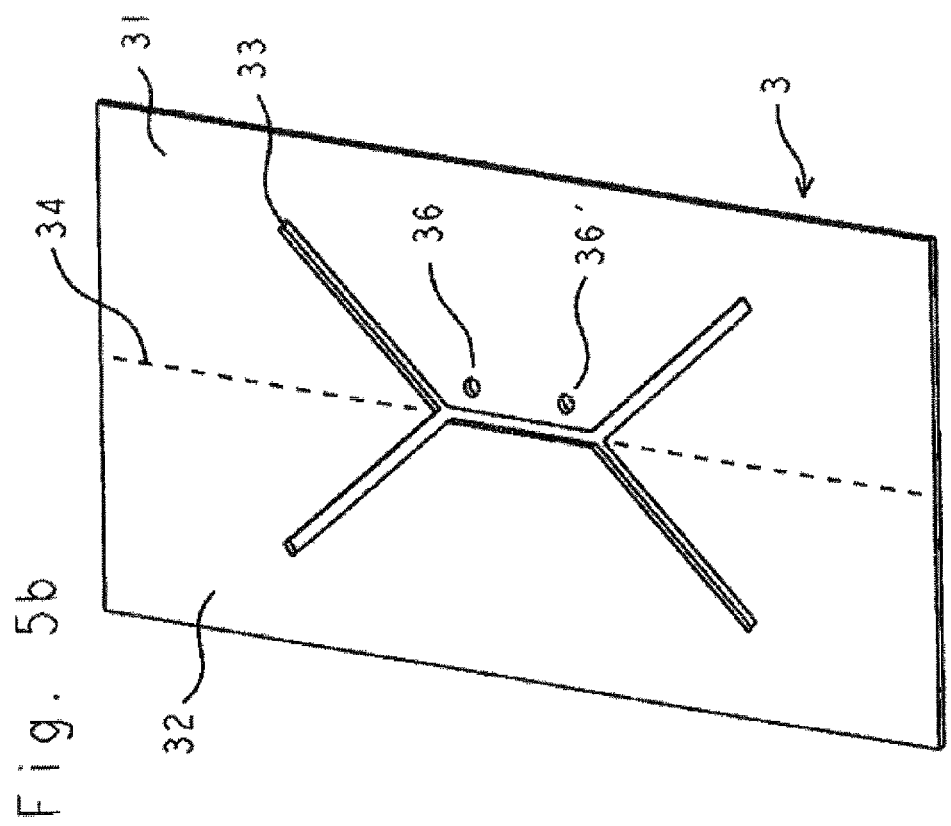

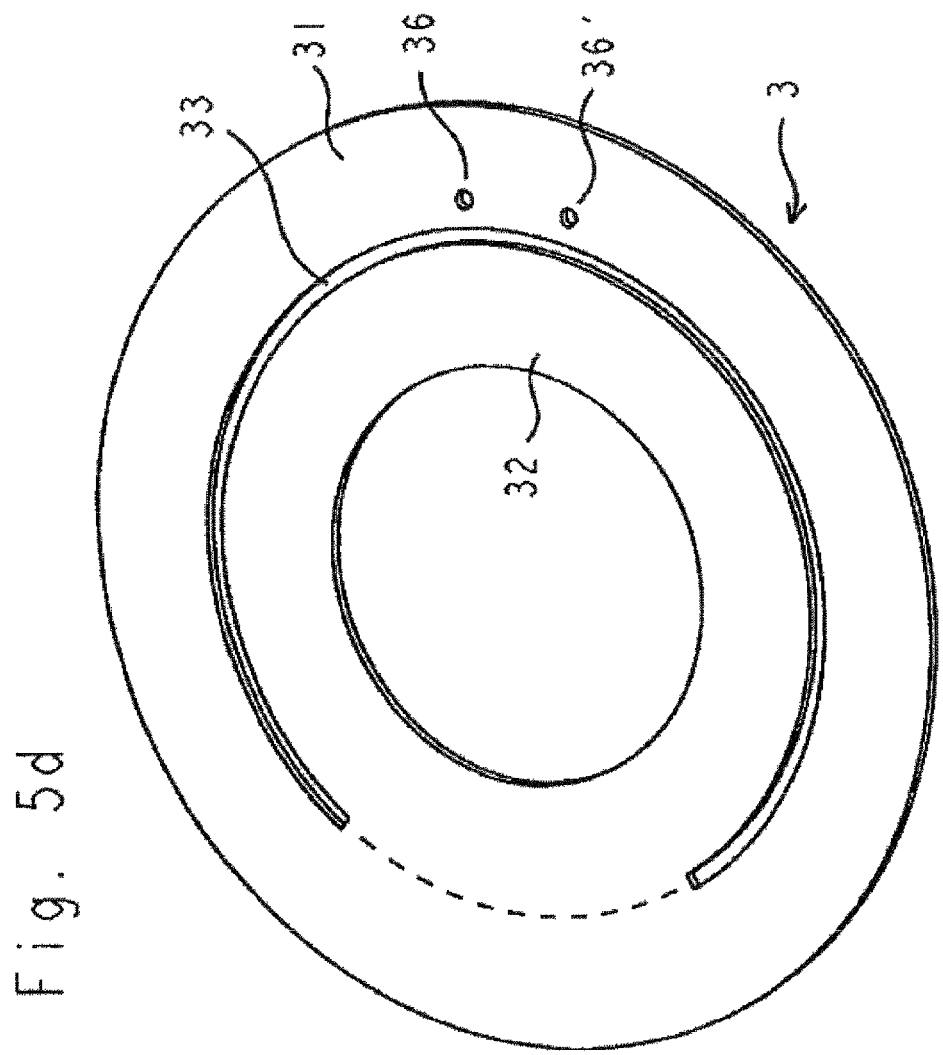

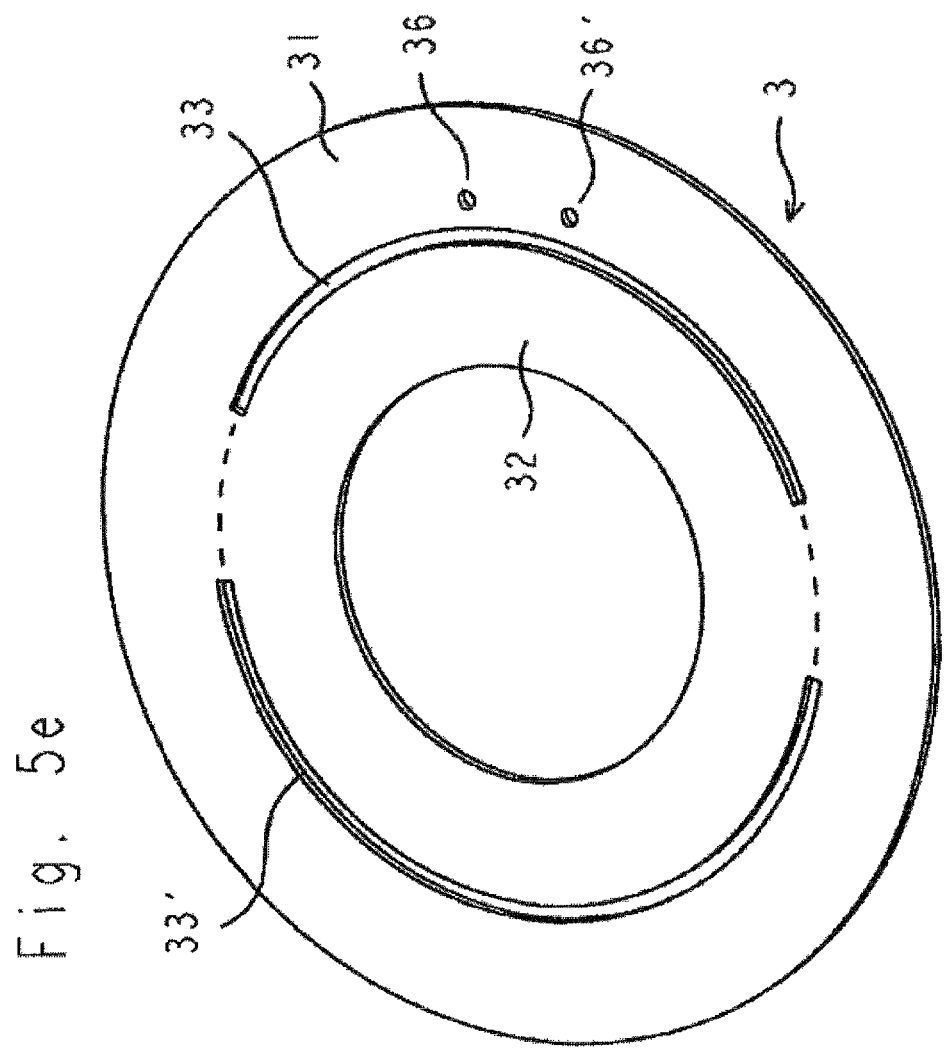

RFID TRANSPONDER

Figure 1A:
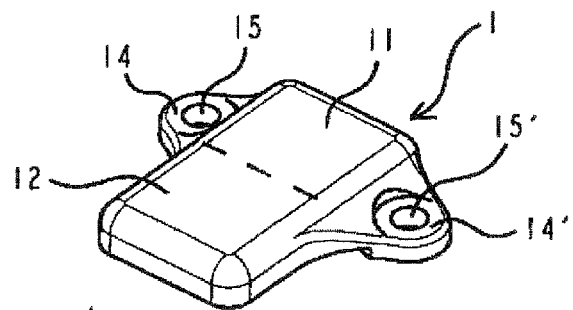

The invention relates to an RFID transponder having a housing, having a coupling loop which is arranged in said housing and is electrically connected to an RFID chip which is arranged in the housing, and having an antenna which consists of a flat metal piece and has a slot and is arranged on an outer face of the housing, wherein the housing is arranged above the slot at least in regions. In this case, the phrase "wherein the housing is arranged above the slot at least in regions" means that at least one region of the housing is arranged above at least one region of the slot.

Radio frequency identification (RFID) transponders are used in a very wide variety of applications, in particular for electronically identifying objects. For example, an identification number for the corresponding object can be stored in the RFID transponder. This identification number can be read by means of a reading device. The problem with this is that passive RFID transponders have to be located very close to the reading device so that a reading process is possible.

PRIOR ART

Document DE 20 2008 001 549 U1 accordingly proposes an RFID transponder which, firstly, can be read over large distances (in a UHF frequency range of from 860 to 950 MHz), in particular over distances of more than 1 m, and, secondly, is highly insensitive to environmental influences.

To this end, said document discloses an apparatus having the following features: an RFID transponder having a housing and a coupling loop which is electrically connected to an RFID chip which is arranged in the housing, and having an antenna which has a slot and is arranged on the outer face of the housing. The externally arranged antenna increases the distance over which the RFID transponder can be read by a reading device. Various geometric configurations can be used for the slot. Said document further discloses that the housing is usually intended to be arranged such that it extends from one side of the slot to the other. In practice, this variant has also proven particularly advantageous in respect of the range of the RFID transponder because it is thereby possible to arrange the coupling loop very close to the slot, specifically directly above the slot.

Unfortunately, it has been found that this prior art is not always sufficient to protect the housing against mechanical stresses. Such stresses can be produced by the antenna, which consists of a flat metal piece, being particularly severely deformed in the region of the slot when said antenna, for its part, is subjected to mechanical stresses. In particular, the orientation of a first antenna part in relation to a second antenna part changes under the action of mechanical stresses which run perpendicular to the slot, wherein the first antenna part and the second antenna part differ in that they are separated by the slot at least in one region of the antenna.

Problem

Therefore, the invention is based on the problem of protecting a housing of an RFID transponder of the kind cited in the introductory part against mechanical stresses or of reducing mechanical stresses which act on said housing, at least to such an extent that damage to the housing and the components arranged in said housing is prevented.

This problem is solved in that the antenna comprises a first antenna part and a second antenna part which are separated from one another by the slot at least in one region of the antenna, and wherein the housing consists of a first housing part and a second housing part, wherein the second housing part is arranged above the second antenna part at least in regions, and wherein the housing is fastened to the first antenna part exclusively by way of the first housing part, and wherein the housing has at least one step on the outer face which is directed toward the antenna, as a result of which the height of the second housing part is at least 0.5 millimeter lower than the height of the first housing part.

In this case, the phrase "wherein the second housing part is arranged above the second antenna part at least in regions" means that at least one region of the second housing part is arranged above at least one region of the second antenna part.

In particular, the height of the second housing part is advantageously at least 0.8 millimeter (mm), preferably at least 1 mm, particularly preferably at least 1.5 mm, and very particularly preferably at least 2 mm, lower than the height of the first housing part.

Advantageous refinements of the invention are specified in claims 2-13.

The invention also relates to an apparatus which is suitable for ensuring that a housing, which is arranged above a slot in a flat antenna, is not subjected to any mechanical stresses or is subjected to only slight mechanical stresses by possible deformation of the antenna.

If the antenna is deformed, for example under the action of mechanical stresses which run perpendicular to the slot, then no mechanical stresses are generated on the housing as a result because the housing is fastened to the first antenna part only by way of its first housing part. In particular, this is also true when the antenna is bent in the direction of the housing because there is a gap between the second housing part and the second antenna part on account of the step, and therefore the second antenna part does not touch the second housing part in this case either.

Furthermore, the antenna increases the distance over which the RFID transponder can be read by a reading device. In addition, the antenna does not have to be electrically connected to the RFID chip in the housing, but rather is excited by the coupling loop. This provides a high level of robustness. In particular, the housing is designed such that the RFID chip which is arranged therein is not damaged either by environmental influences or by high temperatures and chemicals as occur or are used in various industrial cleaning processes. As a result, it is possible, for example, to fit the RFID transponder to beer kegs in order to be able to identify said beer kegs in a contactless manner and over relatively large distances. The RFID transponder is not damaged when the beer kegs are cleaned. If an RFID transponder of this kind is mounted on a beer keg which is smaller than intended for the RFID transponder, in other words which has a smaller radius of curvature than intended, then the antenna will be subject to mechanical stresses. However, the housing and the components located therein, in particular the RFID chip and the coupling loop, are protected from these mechanical stresses.

In a preferred embodiment, the first housing part has at least one, preferably two, fastening lugs which contribute to its height. The second housing part therefore has a height which is at least 0.5 mm, advantageously at least 0.8 mm, preferably at least 1 mm, particularly preferably at least 1.5 mm, very particularly preferably at least 2 mm, lower than the first housing part. As a result, the housing has at least one, preferably two, steps, which are at least 0.5 mm, advantageously at least 0.8 mm, preferably at least 1 mm, particularly preferably at least 1.5 mm, and very particularly preferably at least 2 mm high, at the edge of the fastening lugs on an outer face which is directed toward the antenna, and the corresponding gap remains between the second antenna part and the second housing part.

In a further preferred embodiment, the fastening lugs have fastening eyelets.

The first housing part can, for example, be fastened to the antenna by the fastening eyelets with fastening means such as screws, locating pins, rivets or expanding mandrels. Furthermore, refinements of the housing and of the antenna which provide latching connections between the first housing part and the first antenna part are also feasible.

The antenna preferably consists of a flat metal piece and can be composed of sheet metal.

The length of the slot is advantageously matched to the wavelength λ used by the RFID chip such that the slot length is preferably half the wavelength λ, that is to say λ/2, or else another integer multiple of λ/2, that is to say, for example, 2/2λ, 3/2λ, 4/2λ, 5/2λ . . . etc.

The RFID transponder transmits and receives, in particular, in the frequency range of from 860 to 960 MHz. Accordingly, the wavelength λ lies between 31 cm and 35 cm.

The housing, which contains the RFID chip, can be arranged centrally above the slot in this case, a particularly wide range being possible as a result. The position of the housing can also slightly deviate from this, for example in order to allow certain adjustments to the antenna.

Various geometric configurations, for example linear, curved or forked, can be used for the slot. Configurations of this kind are known from so-called slot radiators. The suitable shape of the slot can be selected depending on the specific application and the requirements resulting therefrom.

According to a preferred embodiment, the antenna is provided with fastening means by means of which the RFID transponder can be fastened to an object. In particular, provision can be made for the fastening means to be designed as a bent fastening section. This embodiment makes use of the strength of the metal piece from which the antenna is formed.

Therefore, the antenna can be fitted directly to, for example, a beer keg, a gas cylinder or a workpiece which is to be processed. This can be performed by pressing, screwing, clipping etc.

The housing can be composed of a mechanically, chemically, thermally and weather-resistant material, for example Vectra LCP 840i LDS.

The RFID chip can be encapsulated in the housing.

The RFID chip can be combined with the coupling loop as a unit on a printed circuit board.

The housing can be closed by means of a cover, wherein the cover is connected to the housing by ultrasonic welding.

EXEMPLARY EMBODIMENT

Figure 1B:
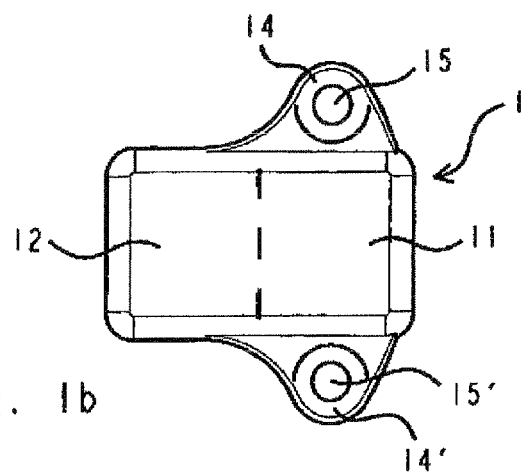
Figure 2:
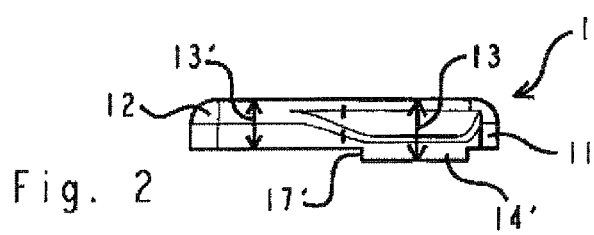
Figure 3:
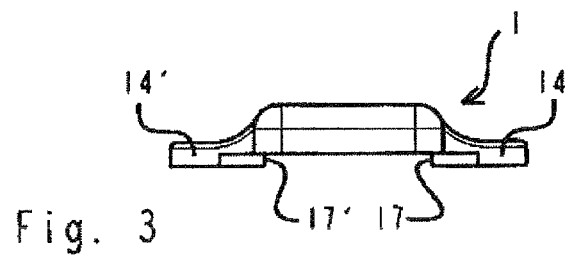
Figure 4A:
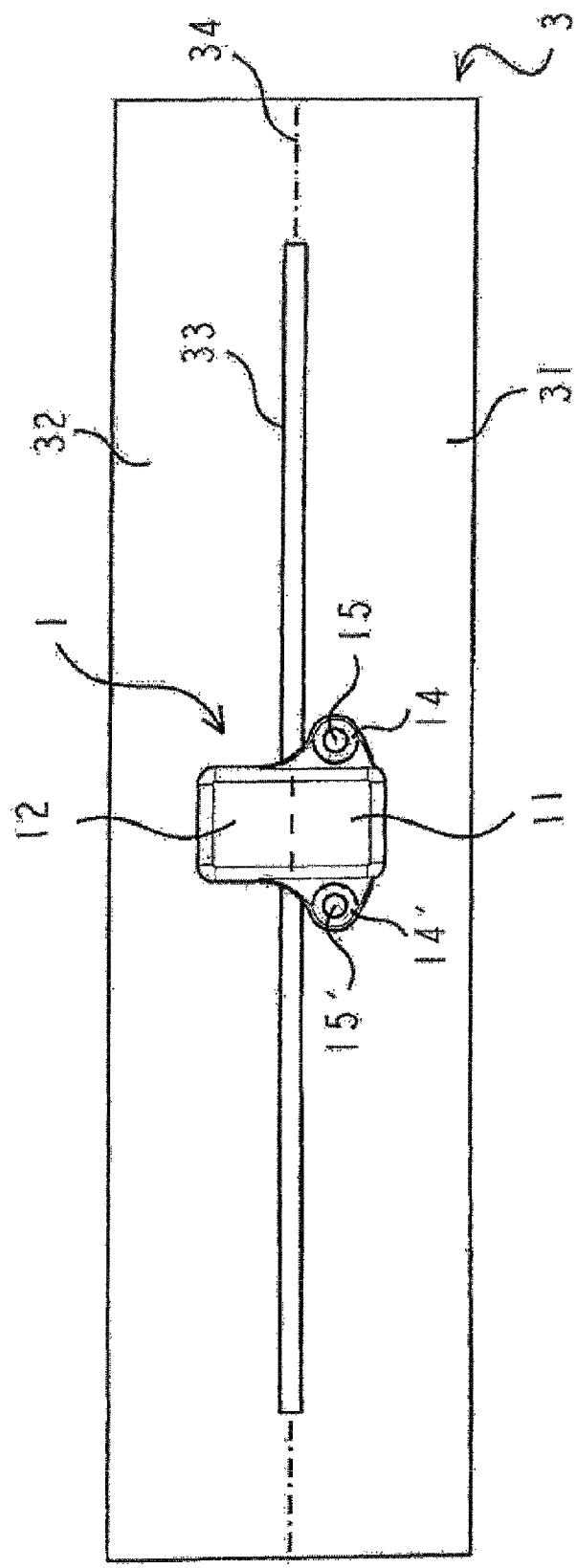
Figure 4B:
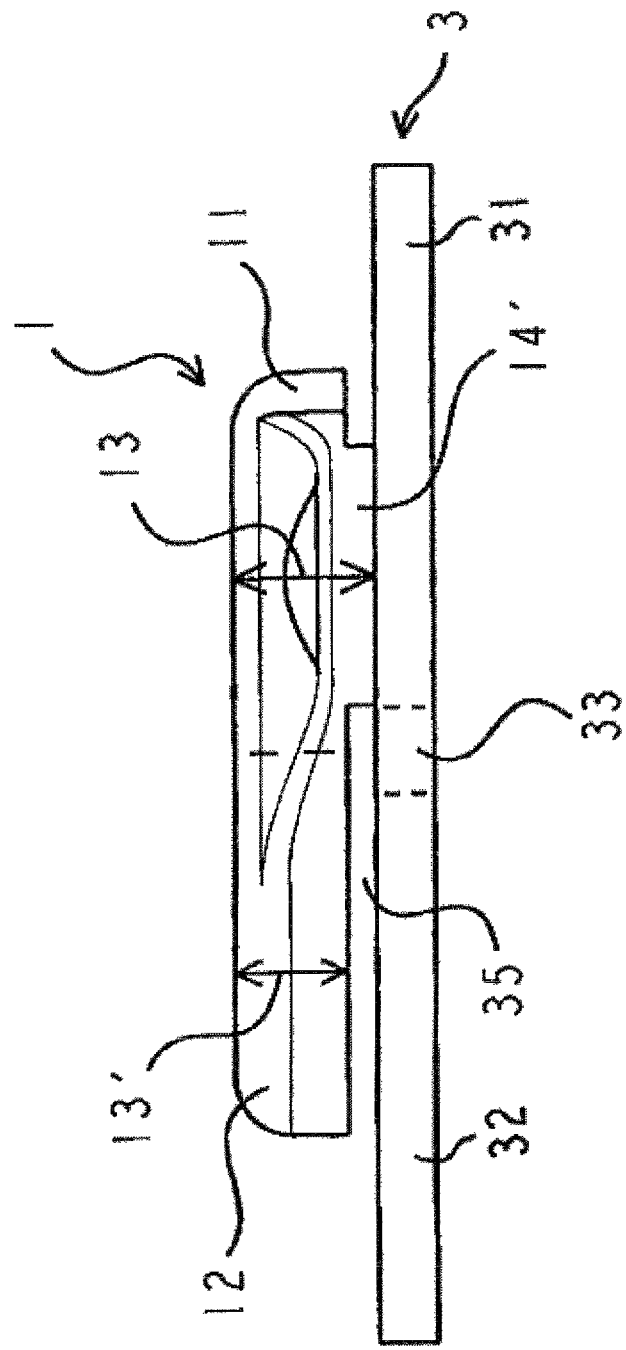

An exemplary embodiment of the invention is illustrated in the drawing and will be explained in greater detail in the text which follows. In the drawing:

FIG. 1a shows an oblique plan view of a housing;
FIG. 1b shows a plan view of the housing;
FIG. 2 shows a side view of the housing;
FIG. 3 shows a rear view of the housing;
FIG. 4a shows a plan view of an RFID transponder having the housing and an antenna;
FIG. 4b shows a side view of an RFID transponder having the housing and the antenna; and
FIG. 5 shows various designs of antennas.

FIG. 1a shows an oblique plan view of a housing 1, and FIG. 1b shows a plan view of said housing. This housing 1 is composed of a first housing part 11 and a second housing part 12. Two fastening lugs 14, 14' with associated fastening eyelets 15, 15' are integrally formed on the first housing part 11. These two fastening lugs 14, 14' form part of the first housing part 11.

FIG. 2 shows a side view of the housing 1. It is clear from said illustration that the height 13 of the first housing part 11 is greater than the height 13' of the second housing part 12. In this case, the two fastening lugs 14, 14' contribute to the height 13 of the first housing part 11.

FIG. 3 shows a rear view of the housing. It is clear from this illustration that the housing 1 has two steps 17, 17' on an outer face, wherein the two steps 17, 17' are arranged at the edge of the associated fastening lugs 14, 14'.

FIG. 4a shows a plan view of an RFID transponder having an associated housing 1 and an antenna 3. The antenna 3 consists of a stamped metal sheet, comprises a first antenna part 31 and a second antenna part 32 and also has a slot 33.

The two antenna parts 31, 32 are separated form one another by an axis 34 of symmetry of the slot 33. It is clear from this illustration that the housing 1 is fastened to the first antenna part 31 exclusively by way of its first housing part 11 by means of its fastening lugs 14, 14'. At the same time, the housing 1 is arranged above the slot 33 in regions, and this means that at least one region of the housing 1 is arranged above at least one region of the slot 33. The housing 1 extends from one side of the slot 33 to the other.

FIG. 4b shows a side view of the RFID transponder having an associated housing 1 and an antenna 3. A gap 35 remains between the second antenna part 32 and the second housing part 12.

The gap 35 has a width which corresponds to the height difference between the two housing parts 11, 12 and is therefore at least 0.5 mm, advantageously at least 0.8 mm, preferably at least 1 mm, particularly preferably at least 1.5 mm, and very particularly preferably at least 2 mm.

Furthermore, the drawing also clearly shows that the second antenna part 32, even when it is bent in the direction of the second housing part 12, does not touch the second housing part 12 because of the gap 35.

Fastening is performed by means of two screws. In further embodiments, possible fastening devices also include locating pins, rivets, expanding mandrels or latching connections, and also combinations of them.

The interior of the housing 1 contains an RFID chip which is accommodated there such that it is protected against environmental influences. The RFID chip can be encapsulated in the interior of the housing 1 or be incorporated in some other way. For example, the housing 1 can consist of two parts which are firmly connected to one another by ultrasonic welding. The housing 10 is composed of a mechanically, chemically, thermally and weather-resistant material, for example Vectra LCP 840i LDS. A coupling loop is arranged centrally in the housing 1. The coupling loop is electrically connected to the RFID chip in the interior of the housing 1. The RFID chip and the coupling loop can be arranged on a common printed circuit board. In this case, the coupling loop can be formed by a conductor track.

The RFID transponder transmits and receives, in particular, in the frequency range of from 860 to 960 MHz. Accordingly, the wavelength lies between 31 cm and 35 cm.

FIGS. 5a to e show, in principle, various designs of the antenna 3. In each case two holes 36, 36' are arranged in each of the illustrated antennas 3. In this case, the two holes 36, 36' are arranged exclusively on one side of the slot 33, specifically on the first antenna part 31. In contrast, the second antenna part 32 does not have any corresponding holes.

FIG. 5a shows an antenna design in which the slot 33 runs in a rectilinear manner and its length is λ/2.

FIG. 5b describes a design in which the length of all possible paths along which the wave crosses the housing 1 is λ/2.

Figure 5C:
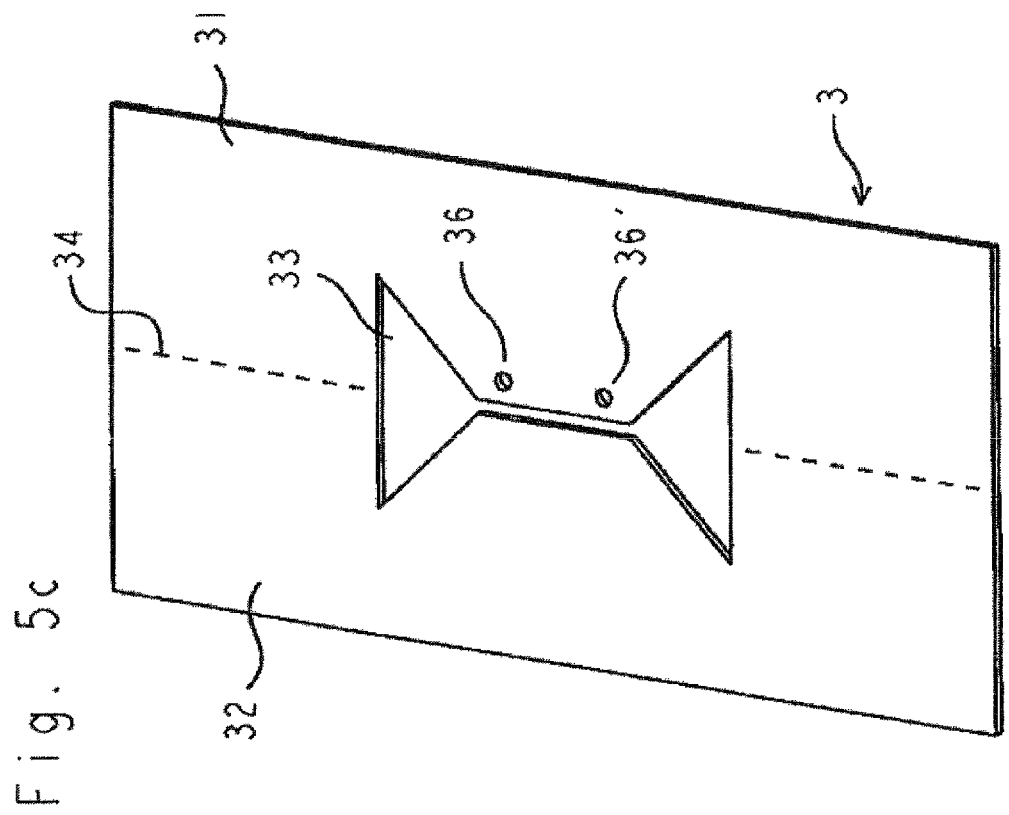

In FIG. 5c, a classic egg-timer shape, also known as an hourglass shape, is provided for the slot 33.

In FIG. 5d, the slot length is twice that of λ/2, that is to say is λ.

In addition to the slot 33 which has the length λ/2, a second slot 33', which likewise has the length λ/2, is added in FIG. 5e. This second slot 33' fulfills the function of a resonator.

In FIGS. 5a to 5c, the axis 34 of symmetry of the slot 33 is illustrated by a dashed line. In FIGS. 5d and 5e, the slots 33, 33' which are in the form of a segment of a circle are continued by the dashed line. In this case, the dashed line separates the first antenna part 31 from the second antenna part 32.

LIST OF REFERENCE SYMBOLS

RFID transponder
File reference: 211-03 WO P H
1 Housing
11 First housing part
12 Second housing part
13 Height of the first housing part
13' Height of the second housing part
14, 14' Fastening lugs
15, 15' Fastening eyelets
17, 17' Steps
3 Antenna
31 First antenna part
32 Second antenna part
33, 33' Slot
34 Axis of symmetry
35 Gap
36, 36' Holes

The invention claimed is:

1. An RFID transponder having a housing, having a coupling loop which is arranged in said housing and is electrically connected to an RFID chip which is arranged in the housing, and having an antenna which comprises a flat metal piece and has a slot and is arranged on an outer face of the housing, wherein the housing is arranged above the slot at least in regions,
wherein the antenna comprises a first antenna part and a second antenna part which are separated from one another by the slot at least in one region of the antenna, and wherein the housing comprises a first housing part and a second housing part, wherein the second housing part is at least partially arranged above the second antenna part, and wherein the housing is fastened to the first antenna part exclusively by way of the first housing part, and wherein the housing has at least one step on the outer face which is directed toward the antenna, as a result of which the second housing part is at least 0.5 millimeter lower in height than the first housing part.

2. The RFID transponder as claimed in claim 1, wherein the first housing part comprises at least one fastening lug which contributes to its height.

3. The RFID transponder as claimed in claim 2, wherein the housing has two steps, each of which is located at the edge of a respective fastening lug.

4. The RFID transponder as claimed in claim 3, wherein each fastening lug has a fastening eyelet.

5. The RFID transponder as claimed in claim 2, wherein each fastening lug has a fastening eyelet.

6. The RFID transponder as claimed in claim 1, wherein the first housing part is connected to the antenna by at least one fastener.

7. The RFID transponder as claimed in claim 1, wherein the fasteners are selected from the group consisting of screws, locating pins, rivets, expanding mandrels or latching connections.

8. The RFID transponder as claimed in claim 1, wherein the antenna is composed of sheet metal.

9. The RFID transponder as claimed in claim 1, wherein the slot in the antenna has a length of λ/2, where λ assumes values of between 31 cm and 35 cm.

10. The RFID transponder as claimed in claim 1, wherein the slot is designed in a curved or forked manner.

11. The RFID transponder as claimed in claim 1, wherein the housing is composed of a mechanically, chemically, thermally and weather-resistant material.

12. The RFID transponder as claimed in claim 11, wherein the housing is comprised of Vectra LCP 840i LDS.

13. The RFID transponder as claimed in claim 1, wherein the RFID chip is encapsulated in the housing.

14. The RFID transponder as claimed in claim 1, wherein the RFID chip is combined with the coupling loop as a unit on a printed circuit board.

15. The RFID transponder as claimed in claim 1, wherein the housing is closed by using a cover which is connected to the housing by ultrasonic welding.

16. The RFID transponder as claimed in claim 1, wherein the first housing part comprises two fastening lugs which contribute to its height.

17. The RFID transponder as claimed in claim 1, wherein the first housing part is connected to the antenna by two fasteners.

* * * * *